(12) United States Patent
Lee

(10) Patent No.: US 7,436,390 B2
(45) Date of Patent: *Oct. 14, 2008

(54) OSD (ON SCREEN DISPLAY) MULTI CURSOR DISPLAY METHOD AND APPARATUS

(75) Inventor: Sung Lyong Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 661 days.

This patent is subject to a terminal disclaimer.

(21) Appl. No.: 09/840,467

(22) Filed: Apr. 24, 2001

(65) Prior Publication Data

US 2002/0180699 A1 Dec. 5, 2002

(30) Foreign Application Priority Data

Apr. 24, 2000 (KR) .............................. 2000-21559

(51) Int. Cl.
*G09G 3/00* (2006.01)

(52) U.S. Cl. .................. 345/156; 345/158; 348/564; 348/569

(58) Field of Classification Search .............. 345/30, 345/35, 38, 507, 508, 764, 509, 769, 856, 345/753, 156, 158, 204; 348/569, 552, 564; 725/38–61

See application file for complete search history.

(56) References Cited

U.S. PATENT DOCUMENTS

| | | | | |
|---|---|---|---|---|
| 5,253,066 A | * | 10/1993 | Vogel | 725/28 |
| 5,548,304 A | * | 8/1996 | Yoshino et al. | 715/856 |
| 5,654,726 A | * | 8/1997 | Mima et al. | 345/2.2 |
| 5,694,544 A | * | 12/1997 | Tanigawa et al. | 715/753 |
| 5,754,258 A | * | 5/1998 | Hanaya et al. | 725/52 |
| 5,973,810 A | * | 10/1999 | Song | 359/142 |
| 5,995,162 A | * | 11/1999 | Fujimori | 348/569 |
| 6,195,087 B1 | * | 2/2001 | Wu | 345/213 |
| 6,195,089 B1 | * | 2/2001 | Chancy et al. | 345/327 |
| 6,344,880 B1 | * | 2/2002 | Takahashi et al. | 348/563 |
| 6,477,705 B1 | * | 11/2002 | Yuen et al. | 725/41 |
| 6,694,514 B1 | * | 2/2004 | Dobbelaar et al. | 725/47 |

* cited by examiner

*Primary Examiner*—Jacques Louis-Jacques
*Assistant Examiner*—Fritz Alphonse
(74) *Attorney, Agent, or Firm*—Sughrue Mion, PLLC

(57) ABSTRACT

An OSD multi cursor display method and apparatus are provided, wherein an OSD source transmits a plurality of OSD multi cursor display data to a display apparatus by giving each data a peculiar ID, said display apparatus stores the plurality of received OSD multi cursor display data in a memory, said OSD source transmits only an OSD multi cursor ID and display location information to said display apparatus, and said display apparatus reads an OSD multi cursor display data of a corresponding ID and displays the data on a screen at a given cursor display location. Since only a plurality of OSD multi cursor data is transmitted initially, and thereafter only the ID of the OSD multi cursor and the display location information are transmitted, the amount of data in transmission is reduced, the processing speed becomes faster, and an OSD multi cursor can be displayed smoothly on a screen.

7 Claims, 3 Drawing Sheets

OSD (ON SCREEN DISPLAY) MULTI CURSOR DISPLAY METHOD AND APPARATUS

BACKGROUND OF THE INVENTION

1. Field of the Invention

The present invention relates to an OSD multi cursor display method and apparatus thereof, particularly to a method and apparatus which can display an OSD multi cursor smoothly on a screen since it only transmits a plurality of OSD multi cursor data at a first time, and thereafter transmits only the ID of the OSD multi cursor and the display location information from an OSD source to a display apparatus. Thus, the amount of data in transmission is reduced and thus the processing speed becomes faster. The present application is based on Korean Patent Application No. 2000-21559, which is incorporated herein by reference.

2. Description of the Related Art

A digital television (DTV) is provided with not only a digital television image signal received through its own tuner but also image information from various sources for display on a screen. That is, a DTV, for example, is provided with a television signal from a satellite through a satellite broadcast receiver such as a step top box (STB) or a cable converter, an image signal reproduced from a digital video disc (DVD) player, and an image signal reproduced from a digital video cassette recorder (DVCR) through an IEEE 1394 bus. The DTV 1394 interface standard is specified in the EIA-775 standard series. Here, a source providing an image signal is defined as a producer, and an apparatus receiving and displaying an image signal like DTV is defined as a consumer. In the DTV 1394 standard, an image signal is provided to a consumer in an MPEG transport stream, and OSD cursor display data is provided to a consumer in a bitmap format. Also, a producer and a consumer exchange a control signal and a state signal.

In general, a producer and a consumer each adopt a remote controller for a user interface. Therefore, the user interface of a consumer is made to interactively control the consumer while displaying in an OSD screen through a remote controller. But, although the user interface of a producer is made to interactively control the producer while displaying in an OSD screen through a remote controller, the OSD screen is actually displayed through a DTV. Therefore, in the case that the amount of OSD cursor display data transmitted between the producer and the consumer is large, by receiving OSD cursor display data of the producer in the consumer, and adaptive display of a displayed screen becomes difficult, according to the excessive amount of processed data for displaying. That is, the change and movement of an image can be unnatural enough for a viewer to visually observe. This phenomenon acts to reduce the value of a product.

Particularly, a smooth operation of an OSD screen becomes more important in evaluating the value of a product, as the user interface of the product becomes more convenient and the function becomes more diverse.

SUMMARY OF THE INVENTION

The present invention has been completed in view of the above-described problems involved in the prior art, and it is an object of the present invention to provide an OSD multi cursor display apparatus and method thereof which can display an OSD multi cursor smoothly on a screen, since initially only a plurality of OSD multi cursor data is transmitted by giving each data a peculiar ID, and thereafter only the ID of the OSD multi cursor and the display location information from an OSD source to a display apparatus are transmitted. Thus the amount of data in transmission is reduced, and the processing speed becomes faster.

According to one aspect of the present invention, the method of the present invention comprises the steps of transmitting a plurality of OSD multi cursor display data from an OSD source to a display apparatus by giving each data a peculiar ID, storing the plurality of OSD multi cursor display data received in said display apparatus in a memory of said display apparatus, transmitting only an OSD multi cursor ID and display location information from said OSD source to said display apparatus, and reading OSD multi cursor display data of a corresponding ID and displaying it on a screen at a given multi cursor display location in response to the ID of the OSD multi cursor and the display location information received in said display apparatus.

According to another aspect of the present invention, the apparatus of the present invention comprises an OSD source remote controller for generating an OSD cursor display command on a screen, an OSD source which transmits a plurality of OSD multi cursor display data by giving each peculiar ID and transmits a selected OSD multi cursor ID and display location information in the case that there is an OSD multi cursor display command from said OSD source remote controller, and a display apparatus which stores the plurality of OSD multi cursor display data received from said OSD source in a memory and reads an OSD multi cursor display data having a corresponding ID from said memory and displays it on a screen at a given display location in response to the received OSD multi cursor ID and display location information.

According to the present invention, the representation of a game, etc. can be performed smoothly because various OSD objects can be displayed very fast by transmitting an ID of an OSD object and display location information, not by transmitting a large amount of OSD display data in bitmap format every time between a producer and a consumer.

BRIEF DESCRIPTION OF THE DRAWINGS

Further objects and advantages of the invention can be more fully understood from the following detailed description taken in conjunction with the accompanying drawings in which.

DETAILED DESCRIPTION OF PREFERRED EMBODIMENTS

The present invention will hereinafter be described in detail through one embodiment of the present invention, with reference to the accompanying drawings.

Figure 1:
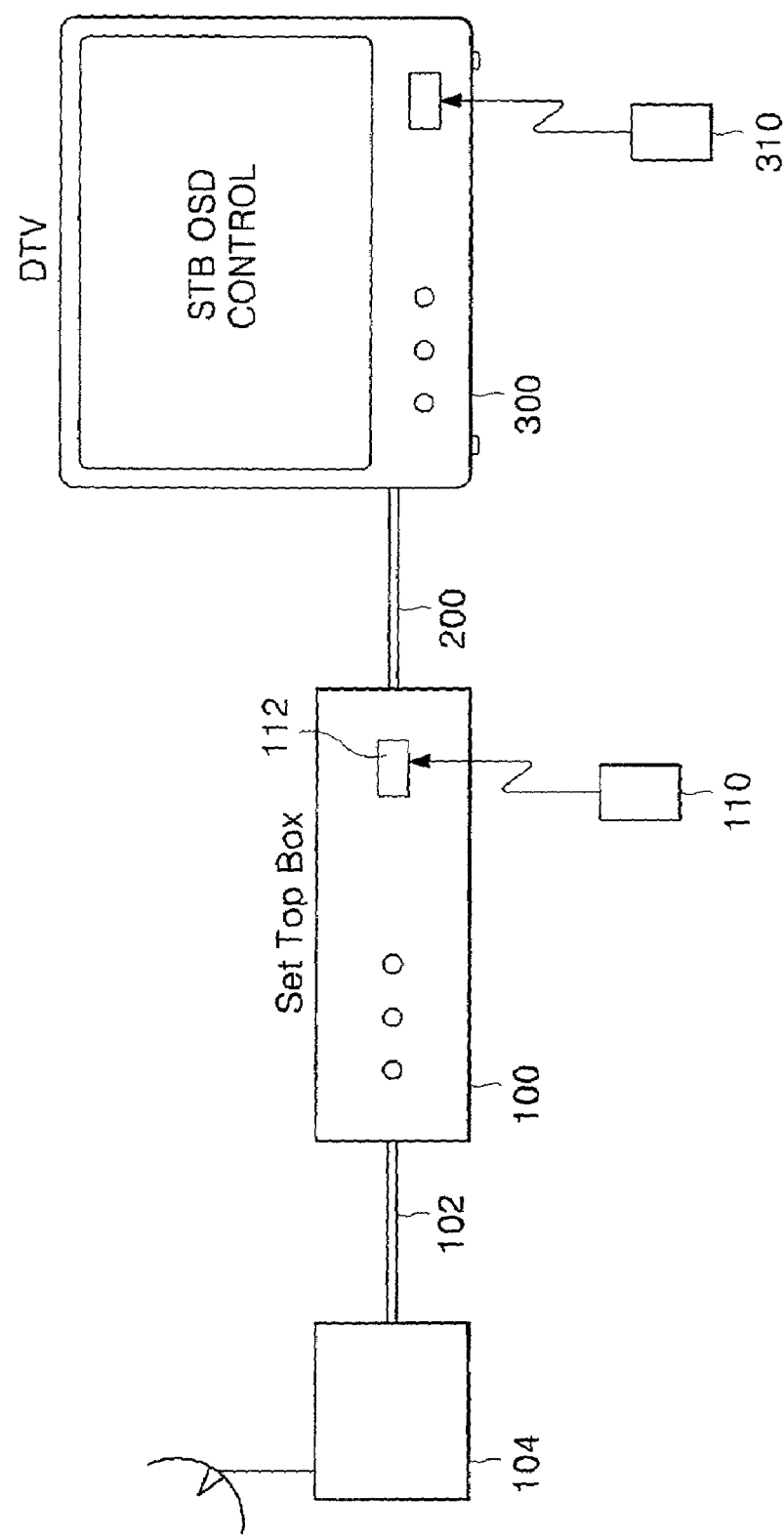
FIG. 1 is a drawing showing one embodiment of an OSD multi cursor display apparatus according to the present invention.

FIG. 1 shows one embodiment of an OSD multi cursor display apparatus according to the present invention.

A set top box 100 and a producer receive a digital satellite broadcast signal provided from a satellite through a satellite antenna 104 connected through a coaxial cable 102. The set top box 100 detects an MPEG transport stream from the received satellite broadcast signal and then provides the detected MPEG transport stream to a DTV 300 through a DTV 1394 bus 200.

The set top box 100 inputs a command generated through a remote controller 110 through a remote controller receiving part 112. Corresponding OSD cursor display data is generated in response to the inputted command and is provided to the DTV 300 through the DTV 1394 bus 200.

The DTV 300 recovers an image signal by decoding the received MPEG transport stream through an MPEG decoder, and displays on a screen by overlapping the recovered image signal and the received OSD cursor display data. Therefore, a user can control an STB 100 while viewing an OSD screen of the STB displayed on a screen of the DTV by using the remote controller for the set top box.

The DTV 300 is controlled through a DTV remote controller 310.

Figure 2:
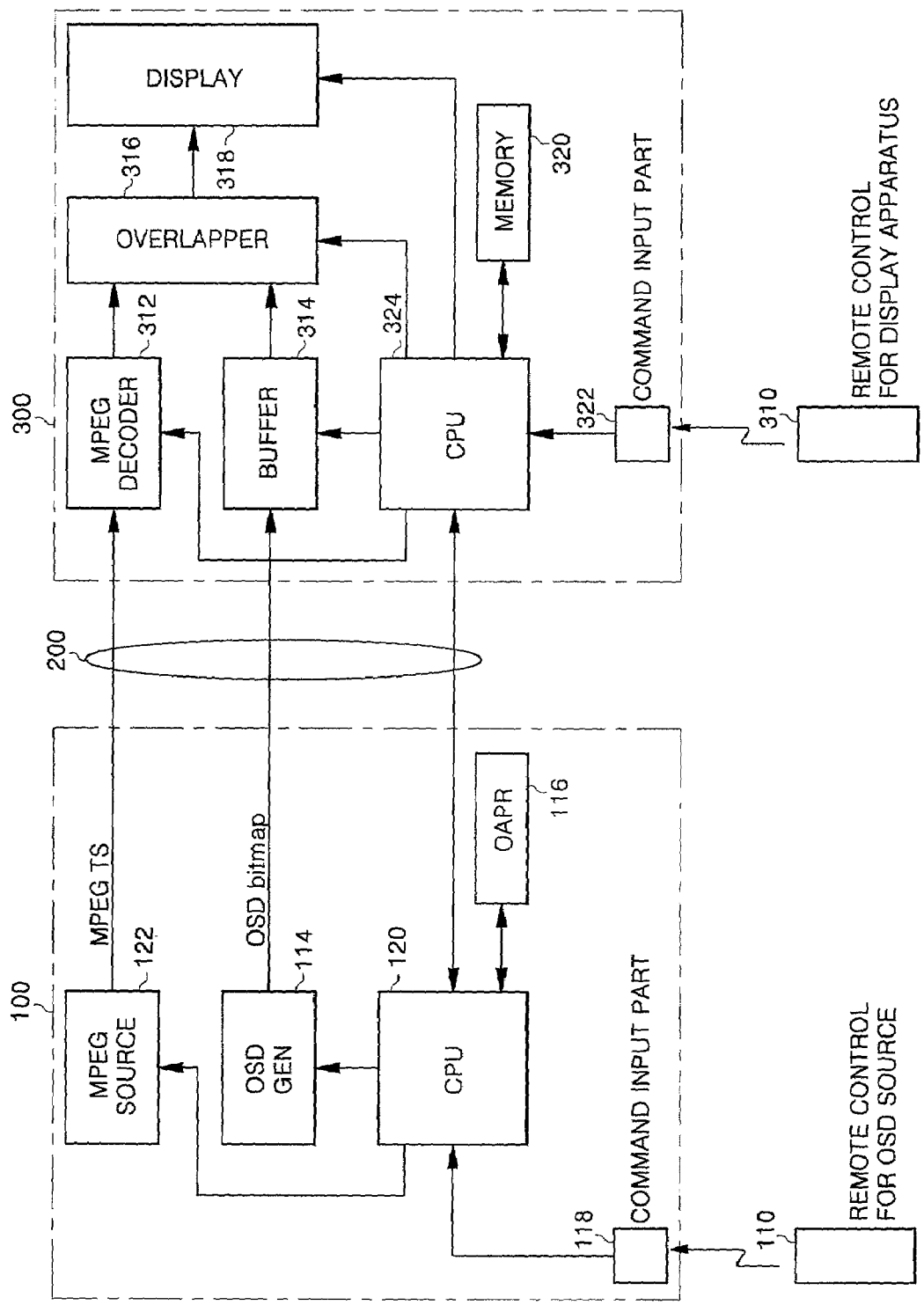
FIG. 2 is a block diagram to illustrate the operation of FIG. 1.

FIG. 2 shows a circuit block diagram to illustrate the operation of FIG. 1.

The set top box 100 and the DTV 300 are interconnected with a DTV 1394 bus 200.

The set top box 100 includes an MPEG source 122, an OSD generator 114, an output asynchronous plug register (OAPR) 116, a command input part 118 and a control part 120. The command input part 118 receives a command signal generated by the remote controller 110 and provides the command signal to the control part 120. The MPEG source detects an MPEG transport stream by inputting a satellite broadcast signal in response to the control of the control part 120 and provides the detected MPEG transport stream to the DTV 300. The OSD generator 114 generates OSD cursor display data in bitmap format in response to the control of the control part 120.

Figure 3:
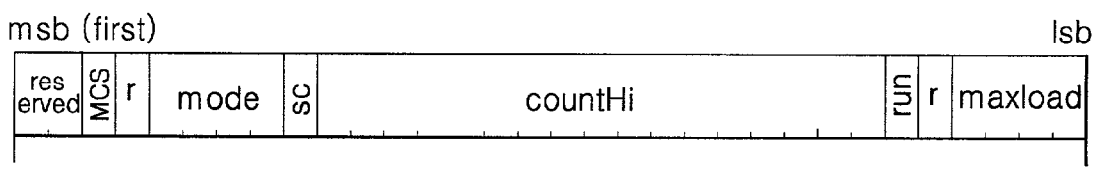
FIG. 3 is a drawing showing data structure of an output asynchronous plug register (OAPR) of a producer according to the present invention.

The output asynchronous plug register OAPR 116 stores four bytes of data as shown in FIG. 3. The data structure of the output asynchronous plug register (OAPR) in FIG. 3 is as shown in Table 1.

TABLE 1

| CLASSIFICATION | DESCRIPTION |
| --- | --- |
| RESERVED | 0 |
| MCS | BIT INDICATING POSSIBILITY OF MULTI CURSOR SAVE |
| RESERVED | 0 |
| MODE | 0: FREE, 1: RESERVED, 2: SUSPEND, 3: RESERVED, 4: RESUME 5: SEND, 6~7: RESERVED |
| SC | TOGGLE BIT |
| COUNTHi | 18 BITS COUNT VALUE |
| RUN | |
| RESERVED | 0 |
| MAX LOAD | INDICATE DATA-PAYLOAD SIZE FOR ENTERING 4 BITS SEGMENT BUFFER |

According to the present invention, the output asynchronous plug register (OAPR) information is provided from the DTV to the STB in initial connection of the STB 100 and the DTV 300. Then, in case of a DTV having an own OSD object data save possibility indicating data, if the OSD object data save possibility information is provided to the STB 100, the STB sets the MCS bit of multi cursor data save possibility indicating bit as "1".

According to the present invention, in case of displaying by transmitting the OSD multi cursor display data from the STB 100 to the DTV 300, first of all, the OSD multi cursor display data are classified by ID and then transmitted. Thereafter, only the ID of an OSD multi cursor and display location information are transmitted.

The DTV 300 includes an MPEG decoder 312, a buffer 314, an overlapper 316, an image display 318, a memory 320, a command input part 322 and a control part 324. The MPEG decoder 312 outputs image data to the overlapper 316 by extending a compression-coded image data by inputting an MPEG transport stream. The buffer 314 buffers the provided OSD cursor display data and provides the corresponding OSD cursor display data to the overlapper 316 overlaps the image data and the OSD cursor display data and provides the overlapped data to the image display 318. The memory 320 stores the OSD cursor display data provided from the STB 100. The command input part 322 receives a command signal generated from the remote controller 310 and provides the command signal to the control part 324.

In the display apparatus, the provided OSD multi cursor display data is classified by ID and is stored. Therefore, an OSD multi cursor display data corresponding to the next provided OSD multi cursor ID and display location information is read from the memory and is displayed on a screen.

Figure 4:
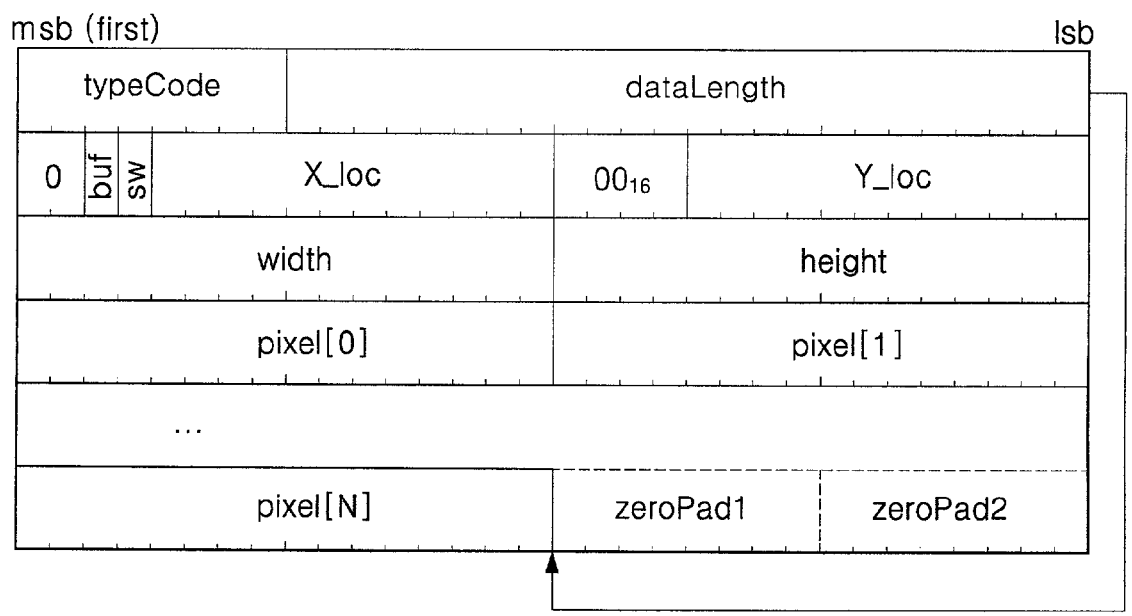
FIG. 4 is a drawing showing an OSD multi cursor display data sub frame structure transmitted from a producer to a consumer according to the present invention.

The STB 100 generates and transmits an OSD multi cursor display data sub frame in FIG. 4 first by controlling the OSD generator 114 through the control part 116 in the case that an OSD multi cursor display command is inputted through the remote controller 110.

The OSD multi cursor display data sub frame in FIG. 4 includes TYPECODE of one byte, data length of three bytes, BUF of one bit, SW of one bit, 12 bits X coordinate value of cursor display location, 12 bits Y coordinate value of a cursor display location, cursor display width of two bytes, cursor display height of two bytes and a plurality of two bytes pixel data in bitmap format. TYPECODE of said sub frame has a value of "0XA1" for example. Here, "0X" of "0XA1" indicates HEXA CODE. Therefore, "A1" indicates a value of HEXA CODE. Next, TYPECODE of the multi cursor display data sub frame is increased to "0XA2" by "1". Each of the plurality of OSD multi cursor display data is given with a peculiar ID and then transmitted.

In the DTV 300, the plurality of received OSD multi cursor display data are classified by ID and then stored in the memory 320.

Figure 5:
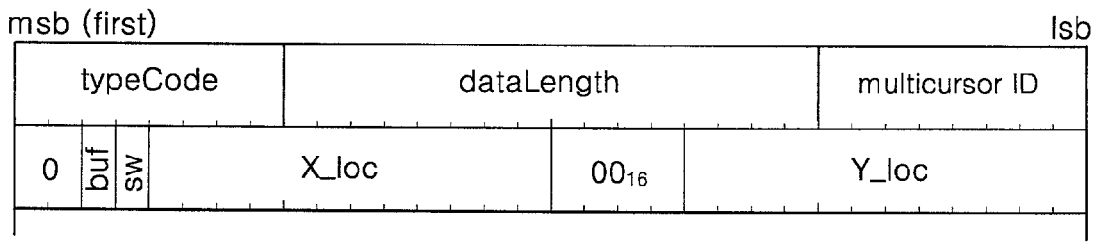
FIG. 5 is a drawing showing an OSD cursor ID sub frame structure transmitted from a producer to a consumer according to the present invention.

After the initial setting operation is completed, the STB transmits the ID and display location information of the OSD multi cursor selected by the remote controller 110 to the OSD multi cursor ID sub frame in FIG. 5.

The OSD multi cursor ID sub frame includes TYPECODE of one byte, data length of two bytes, a multi cursor ID of one byte, BUF of one bit, SW of one bit, 12 bits X coordinate value of cursor display location and 12 bits Y coordinate value of a cursor display location. If a first multi cursor among a plurality of multi cursors is selected, the multi cursor ID is set as "0XA1". The data length is constituted with 5 bytes. BUF has a value of "0" and SW has a value of "0". "00" of BUF and SW is a control code for locating cursor display data in the buffer 314 in the consumer.

Therefore, the DTV 300 analyzes the sub frame in FIG. 5 received in the buffer 314 and, if the value of TYPECODE is "0XA0", recognizes a multi cursor mode. If TYPECODE "0XA0" is recognized, the DTV 300 analyzes the multi cursor ID and, if the ID is "0XA1", reads multi cursor display data having TYPECODE "0XA1" from the memory 320 and displays it on a given XY coordinate system.

Therefore, according to the present invention, the STB 100 does not send the OSD multi cursor display data in bitmap format every time to the DTV 300. The STB 100 sends all of the plurality of OSD multi cursor display data by giving an ID of each of the respective OSD multi cursor display data, and thereafter, sends only selected OSD multi cursor ID and display location information. Then, the DTV 300 reads an OSD multi cursor display data having a corresponding ID and displays it on a given location on the screen. Because the amount of data reception and transmission between the STB 100 and the DTV 300 is largely reduced, OSD display on the screen can be performed very fast. Therefore, OSD multi cursor display data can be viewed very naturally by a user. Particularly, it can be very effectual in displaying an animation cursor.

Thus, the representation of a game, etc. can be performed smoothly, because various OSD objects can be displayed very fast by transmitting an ID of an OSD object and display location information, not by transmitting a large amount of OSD cursor display data in bitmap format every time between a producer and a consumer.

While the present invention has been described with respect to the particular embodiments, it will be apparent to those skilled in the art that various changes and modifications may be made without departing from the spirit and scope of the invention as defined in the following claims.

What is claimed is:

1. An OSD (On Screen Display) display method, comprising the steps of:
    transmitting from an OSD source a plurality of OSD multi cursor display data and giving each OSD multi cursor display data a peculiar ID;
    storing the plurality of transmitted OSD multi cursor display data in a memory of a display apparatus;
    transmitting only an OSD multi cursor ID and display location information from said OSD source to said display apparatus; and
    reading OSD multi cursor display data of a corresponding ID and displaying the OSD multi cursor display data on a screen at a given cursor display location in response to the OSD multi cursor ID and display location information.

2. An OSD (On Screen Display) display apparatus, comprising:
    an OSD source remote controller for generating an OSD cursor display command on a screen;
    an OSD source for transmitting a plurality of OSD multi cursor display data and giving each OSD multi cursor display data a peculiar ID and transmitting a selected OSD multi cursor ID and display location information in the case that there is an OSD multi cursor display command from said OSD source remote controller; and
    a display apparatus for storing the plurality of OSD multi cursor display data received from said OSD source in a memory and reading an OSD multi cursor display data having a corresponding ID from said memory and displaying the OSD multi cursor display data on a screen at a given display location in response to the received OSD multi cursor ID and display location information.

3. The OSD image display apparatus of claim 2, wherein the OSD source comprises:
    an MPEG source for supplying an MPEG transport stream to the display apparatus;
    an OSD generator for generating OSD display data in bitmap format;
    a register for storing data provided to the display apparatus upon initial connection of the display apparatus and the OSD source; and
    a controller for controlling the MPEG source, the OSD generator, and the register.

4. The OSD image display apparatus of claim 3, wherein the OSD source further comprises:
    a command input part for receiving a command signal from the OSD source remote controller and providing the command signal to the controller.

5. The OSD image display apparatus of claim 2, wherein the display apparatus comprises:
    an MPEG decoder for decoding an MPEG transport stream and outputting image data;
    a buffer for buffering OSD data;
    an overlapper for overlapping the image data and the OSD data and providing overlapped data to the screen; and
    a controller for controlling the MPEG decoder, the buffer, the overlapper, the memory, and the screen.

6. The OSD image display apparatus of claim 5, wherein the OSD image display apparatus further comprises:
    a display apparatus remote controller.

7. The OSD image display apparatus of claim 6, wherein the display apparatus further comprises:
    a command input part for receiving a command signal from the display apparatus remote controller and providing the command signal to the controller.

* * * * *